United States Patent
Coors et al.

(10) Patent No.: US 9,214,817 B2
(45) Date of Patent: Dec. 15, 2015

(54) CIRCUITRY ARRANGEMENT FOR A SOLAR POWER PLANT COMPRISING A DC VOLTAGE SOURCE FOR AN OFFSET VOLTAGE

(71) Applicant: SMA Solar Technology AG, Niestetal (DE)

(72) Inventors: Stephanie Coors, Knuellwald (DE); Michael Viotto, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 688 days.

(21) Appl. No.: 13/645,620

(22) Filed: Oct. 5, 2012

(65) Prior Publication Data
US 2013/0088086 A1    Apr. 11, 2013

(30) Foreign Application Priority Data
Oct. 7, 2011 (DE) .......................... 10 2011 054 315

(51) Int. Cl.
| | |
|---|---|
| H02J 1/00 | (2006.01) |
| H02J 3/00 | (2006.01) |
| H02J 5/00 | (2006.01) |
| H02J 1/10 | (2006.01) |
| H02J 3/38 | (2006.01) |

(52) U.S. Cl.
CPC ... *H02J 5/00* (2013.01); *H02J 1/00* (2013.01); *H02J 1/10* (2013.01); *H02J 3/383* (2013.01); *Y02E 10/563* (2013.01); *Y10T 307/658* (2015.04)

(58) Field of Classification Search
CPC ............... H02J 1/00; H02J 1/003; H02J 5/00; H02H 1/003
USPC ................... 307/45, 82, 151; 361/42, 43, 62
See application file for complete search history.

(56) References Cited

U.S. PATENT DOCUMENTS

| | | |
|---|---|---|
| 8,053,930 B2 | 11/2011 | Cramer et al. |
| 8,138,411 B2 | 3/2012 | Beck et al. |
| 2009/0101191 A1 | 4/2009 | Beck et al. |
| 2009/0315404 A1 | 12/2009 | Cramer et al. |
| 2010/0110742 A1* | 5/2010 | West .............................. 363/132 |
| 2011/0273017 A1 | 11/2011 | Borup et al. |
| 2012/0001491 A1 | 1/2012 | Cramer et al. |

FOREIGN PATENT DOCUMENTS

| | | |
|---|---|---|
| CH | 219 287 A | 1/1942 |
| DE | 1255783 | 12/1967 |
| EP | 2086020 A2 | 8/2009 |
| EP | 2136449 A1 | 12/2009 |
| WO | 2010051812 A1 | 5/2010 |
| WO | 2010078669 A1 | 7/2010 |

* cited by examiner

*Primary Examiner* — Carlos Amaya
(74) *Attorney, Agent, or Firm* — Eschweiler & Associates, LLC

(57) ABSTRACT

A circuitry arrangement for a solar power plant includes a transformerless inverter for feeding electric power from at least one photovoltaic generator into an alternating power grid, a galvanic separation of all lines carrying current between the inverter and the power grid, and a DC voltage source in an offset path between one electric line at the input side of the galvanic separation and a reference potential. The DC voltage source provides an offset voltage. The offset path includes a DC branch and an AC branch connected in parallel. The direct voltage source is connected in series with a current sensor in the DC branch, and at least one capacitor is arranged in the AC branch. Further, a DC contactor triggered by the current sensor is arranged in the offset path.

16 Claims, 5 Drawing Sheets

CIRCUITRY ARRANGEMENT FOR A SOLAR POWER PLANT COMPRISING A DC VOLTAGE SOURCE FOR AN OFFSET VOLTAGE

REFERENCE TO RELATED APPLICATION

This application claims priority to German application number 10 2011 054 315.5 filed on Oct. 7, 2011.

FIELD

The present invention relates to a circuitry arrangement for a solar power plant comprising at least one generator terminal configured to connect to a photovoltaic generator, a grid terminal configured to connect to an AC power grid, and a DC voltage source configured to provide an offset voltage to adjust an electric potential of a photovoltaic generator when connected to the at least one generator terminal.

BACKGROUND

It is a known phenomenon that the modules of certain photovoltaic generators, particularly so-called thin film modules, achieve their maximum lifetime only if they are completely on a negative or a positive electric potential with regard to earth potential. A DC voltage source providing an offset voltage may be used to ensure such an electric potential of the modules of a photovoltaic generator with regard to earth potential.

EP 2 136 449 B1 discloses a circuitry arrangement for a solar power plant. This circuitry arrangement includes an inverter, a transformer providing a galvanic separation of all electric lines carrying alternating current between an inverter and a grid terminal, and an offset path leading from one of the electric lines at the primary side of the transformer to earth potential. A DC voltage source is arranged in the offset path and provides an offset voltage for adjusting an electric potential of a photovoltaic generator connected to the DC side of the inverter with regard to earth potential. The transformer provides the galvanic isolation between several transformerless inverters connected in parallel and the grid terminal. If the transformer comprises a center point connection at its primary side, the offset path is connected to the center point. If the transformer comprises a delta configuration at its primary side, the offset path is provided between one of the phase lines and earth potential. The inverters connected in parallel each feed electric power from one photovoltaic generator into one of three phase lines to the transformer. In transformerless inverters, a potential shift by a certain DC component at the AC or output side also results in a potential shift of photovoltaic generators connected to the DC or input side and vice versa. The offset voltage of the DC voltage source thus has the effect that the photovoltaic generators connected to the inverters are completely at positive electric potential. Additionally, a current surveying or monitoring device of the DC voltage source may be used for identifying earth faults. In case of an isolation or earth fault, an increased current via earth potential flows through the offset path. In case of an isolation or earth fault, a contactor is triggered that interrupts the current connection between the inverter and the transformer or between the grid terminal and the transformer.

WO 2010//051812 A1 discloses a further circuitry arrangement for a solar power plant. Here, single- or three-phase transformerless inverters are connected in parallel and each feed electric power from one photovoltaic generator via a common transformer providing a galvanic separation into an AC power grid. A DC voltage source for an offset voltage is connected to the center point of the primary side of the transformer, independently of whether this center point is connected to the individual inverters or not. In this known circuitry arrangement, the height of the offset voltage which is provided by the DC voltage source is adjusted to the present output voltage of the photovoltaic generators. Thus, the electric potential of the photovoltaic generators is always shifted by an offset voltage which is just sufficient to render the electric potential of the photovoltaic generators completely positive or negative.

According to WO 2010/051812 A1, only very small currents flow through the DC voltage source for the offset voltage so that only very little electric power is dissipated due to the offset voltage. Actually, the power is estimated as having an order of 1 W only. This may be correct with regard to the current generated by the offset voltage as long as there is no fault current via earth. Such a fault current may, however, readily have an order of 1 A. With a typical offset voltage of several 100 V, this means several 100 W of power. Additionally, potential variations which occur in the operation of usual inverters at their DC side, together with a high electric capacitance of the modules of photovoltaic generators with regard to earth potential, result in high capacitive leakage currents which flow back through the DC voltage source in the offset path. The capacitive leakage currents have a typical order of some 100 mA up to several amperes and strongly depend on the weather. The electric capacitance of modules of photovoltaic generators with regard to earth potential, for example, strongly varies with air moisture and particularly due to rainfall onto the modules. A comparatively high alternating current component of the current through the offset path towards earth potential is thus no indication of an earth or isolation fault, but considerably stresses the DC voltage source arranged in the offset path. On the other hand, even a comparatively low direct current through the offset path is an indication of a dangerous fault and has thus to be switched off immediately or at least to be reduced to a safe value.

Particularly, such a fault current has to be immediately switched off or at least reduced to a safe value for security reasons if the solar power plant shall be operated further for feeding further electric power into a connected AC power grid. Here, it has to be taken into consideration that the current through the offset path—particularly in case of a fault—is a mixture of alternating current and direct current components with a comparatively high direct current component. A circuit breaker sensitive to mixed currents, particularly an RCD type B, is not suited for securely switching off such a fault current as this device only switches off a mixed current having a small direct current component at maximum. With a higher direct current component, an electric arc occurs between the contacts of the device via on which the fault current flows. Thus, it is not possible to protect the known circuitry arrangements for solar power plants by a usual circuit breaker in the offset path which switches off both any fault currents occurring and the earth reference via the offset path so that an isolation or earth fault only results in different earth reference, but does not require that the solar power plant is switched off instantaneously.

A further circuitry arrangement for adjusting the electric potential of photovoltaic generators of a solar power plant is known from WO 2010/078669 A1. Here, an offset path consists of a potential shifting device made as a DC voltage source for generating a DC voltage between earth potential and an output of an inverter. The DC voltage source consists of a transformer, a rectifier and a voltage regulator, a capacitor being connected in parallel to its two outputs. At its primary side, the transformer is connected to the outputs of the inverter. On its secondary side, the transformer is connected to the rectifier.

EP 2 086 020 A2 discloses a photovoltaic power plant with potential shift. Here an offset path extends from earth potential to one of two inputs of an inverter. A DC voltage source, a current sensor and a circuit breaker are arranged in the offset path. The circuit breaker is opened if the current registered by the current sensor exceeds a threshold value. The current flowing through the DC voltage source and measured by the current sensor is a mixed current of alternating current and direct current components. Thus, there is basically the same problem as with the circuitry arrangement known from WO 2010/051812 A1: A comparatively high alternating current component of the current through the offset path towards earth potential is not yet an indication of an earth or isolation fault although it considerably stresses the direct voltage source arranged in the offset path.

DE 1 255 783 discloses a earth fault protection device for galvanically connected direct and alternating voltage systems. The earth fault protection device comprises two paths connected in parallel. In the first parallel path, a resistor for current limitation, a first direct current relay for indicating an earth fault and a DC source are connected in series. Capacitors for sieving out alternating current are connected in parallel to the first direct current relay and the DC source. In the second parallel path, a capacitor blocks direct current, and a resistor limits the current. Further, a second direct current relay is arranged in such a way that it travels if an alternating current flows through the second parallel path. The first and second direct current relays thus indicate a flowing direct current on the one hand and a flowing alternating current towards earth on the other hand.

There still is a need for a circuitry arrangement for a solar power plant solving the problems which are connected with leakage currents flowing via the offset path.

SUMMARY OF THE INVENTION

The present invention relates to a circuitry arrangement for a solar power plant. The circuitry arrangement comprises at least one generator terminal configured to connect to a photovoltaic generator, a grid terminal configured to connect to an AC power grid, and at least one transformerless inverter configured to feed electric power from a photovoltaic power generator connected to the at least one generator terminal into an AC power grid connected to the grid terminal. The circuitry arrangement further comprises first electric lines extending between the at least one generator terminal and the at least one inverter, and second electric lines extending between the at least one inverter and the grid terminal. The arrangement also comprises a galvanic isolation provided in all second electric lines carrying a current between the at least one inverter and the grid terminal, and an offset path leading from one of the first and second electric lines on that side of the galvanic isolation opposing the grid terminal to a reference potential. The offset path comprises a direct current branch and an alternating current branch connected in parallel, at least one capacitor arranged in the alternating current branch, and a DC voltage source arranged in the direct current branch, wherein the DC voltage source provides an offset voltage to adjust an electric potential of the photovoltaic power generator connected to the at least one generator terminal with regard to earth potential. The offset path further comprises a current sensor connected in series with the direct voltage source in the direct current branch, and a direct current contactor arranged in the offset path and configured to switch off at least a direct current component of a fault current flowing through the offset path.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
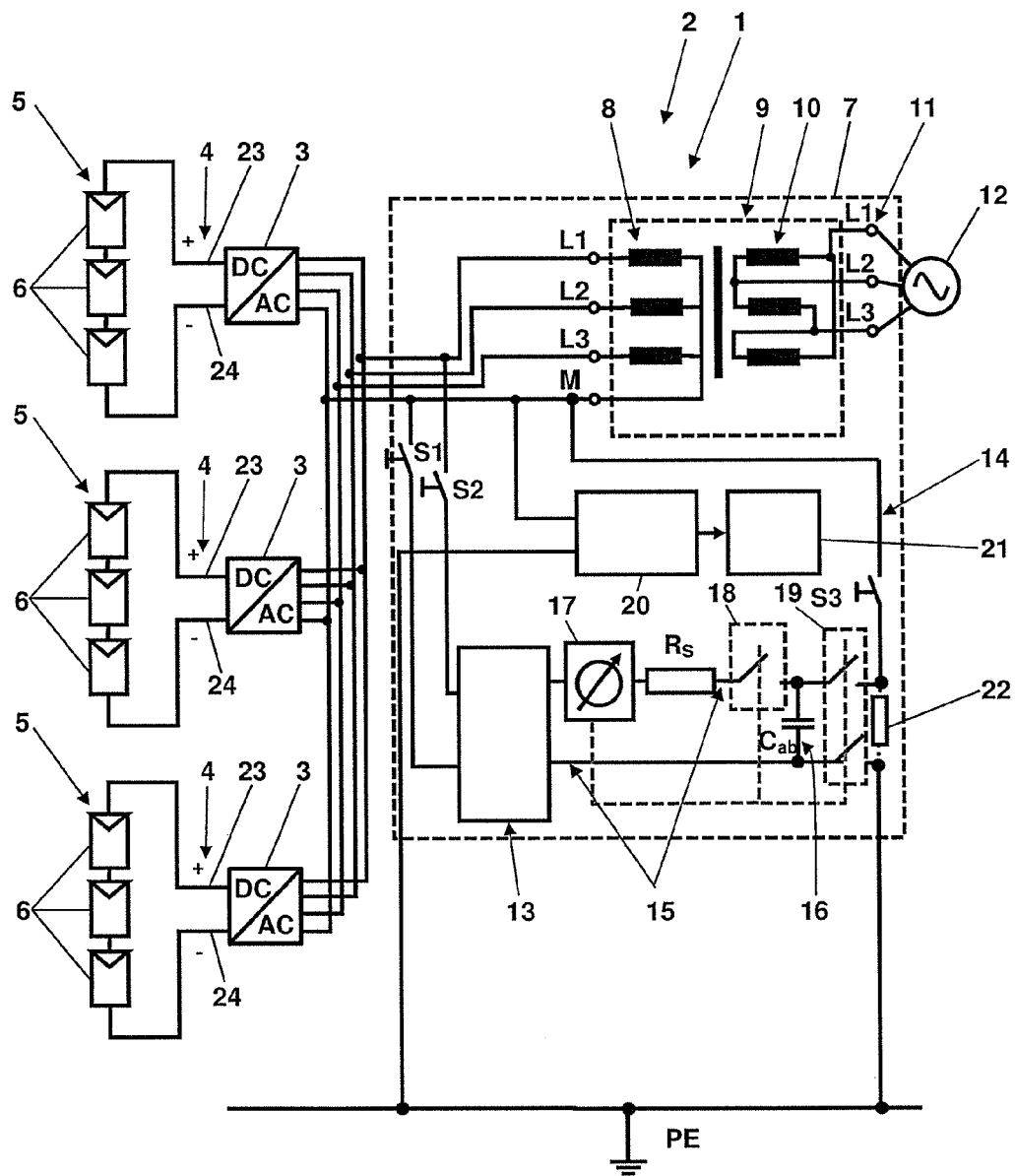
FIG. 1 is a circuit diagram of a first embodiment of the circuitry arrangement for a solar power plant according to the present invention.

In the circuitry arrangement of the present invention, the offset path leading from the electric line connected to the at least one inverter on the input side of the galvanic isolation, i.e. on the side of the galvanic isolation opposing the grid terminal, to a reference potential comprises a direct current (DC) branch and an alternating current (AC) branch connected in parallel. The direct or DC voltage source for the offset voltage with regard to the reference potential is arranged in the DC branch. At least one capacitor is provided in the AC branch. The capacitance of this capacitor is selected such that it has just a low AC resistance at those frequencies at which a leakage current flows through the offset path. Particularly, this AC resistance is much smaller than an AC resistance of the DC branch. Thus, the leakage current flowing through the offset path predominantly flows through the AC branch, whereas the entire direct current flows through the DC branch and thus through the DC voltage source arranged therein. In this way, the DC voltage source is unloaded from the leakage current. In the normal, i.e. faultless operation of the circuitry arrangement, the current load of the DC voltage source is thus reduced to a harmless level.

For the purpose of acknowledging or recognizing fault currents and isolation and earth faults by means of such fault currents, the DC voltage source is connected in series with a current sensor in the DC branch. For the purpose of switching off at least the direct current component of a fault current flowing, a DC circuit breaker is provided in the offset path. This DC circuit breaker may be triggered, i.e. opened, directly by the current sensor upon a current through the DC branch exceeding a threshold value, as the current sensor in the DC branch selectively measures the direct current component of the earth current which is particularly relevant as an indication of a fault current.

In the circuitry arrangement according to the present invention, the reference potential to which the offset path leads may be a reference potential differing from earth potential or a reference potential at a defined offset with regard to earth potential. In one embodiment, however, the reference potential is earth potential.

In one embodiment the DC voltage source is connected in series with a resistor in the DC branch to further limit the current flowing through the DC branch of the offset path and to thus particularly protect the DC current source against flowing fault currents.

In the circuitry arrangement of the present invention, the direct current components of flowing fault currents may selectively be switched off by means of a DC circuit breaker also arranged in the DC branch.

For the purpose of also switching off the AC components of occurring fault currents through the offset path securely, an additional AC circuit breaker may be provided in the offset path. If the AC circuit breaker only opens after the DC circuit breaker in the DC branch has been opened, a pure alternating current flows through the offset path when the AC circuit breaker opens. Such a pure alternating current can be securely switched off with common AC circuit breakers.

In one embodiment the circuitry arrangement according to the present invention may switch off the entire current flowing via the offset path, i.e. inclusive of its AC components, with a single DC circuit breaker in a secure way. For this purpose, the DC circuit breaker may be provided in a part of the offset path not branched into the DC branch and the AC branch, and combined with a full wave rectifier.

In one embodiment, the DC circuit breaker comprises means for avoiding and/or extinguishing a switching arc. Suitable embodiments of such means are known to those skilled in the art. For example, a so-called vacuum circuit breaker may be used as the DC circuit breaker. In a vacuum circuit breaker, the interior of a circuit breaker housing is evacuated to such an extent that a residual gas pressure is insufficient to ignite or maintain an electric arc between the switching contacts. Further, a circuit breaker comprising a so-called blowing magnet may be used as the DC circuit breaker. A further known approach for avoiding a switching arc includes connecting a further part in parallel with the electromagnetic switch. For example, capacitors, Positive Temperature Coefficient (PTC) elements and semiconductor switches may be used for this purpose. In this approach, at least for a short time prior to the actual separation process of the switching contacts of the circuit breaker, a parallel current path is provided between the switching contacts to which the current may commutate. In this way, the potential difference between the switching contacts is also reduced. The actual separation process of the switching contacts thus occurs at a considerably reduced potential difference between the switching contacts. This potential difference is particularly no longer able to ignite or maintain a switching arc across the switching contacts.

In the circuitry arrangement according to the present invention, a high-resistance resistor may be connected in parallel to the parallel connection of the DC branch and the AC branch of the offset path. In this case, the AC circuit breaker or the DC circuit breaker combined with the full wave rectifier is arranged in that part of the offset path which is connected in parallel to the high-resistance resistor. In one embodiment, the high-resistance resistor is separated from the offset path, and, thus, does not carry a current in the normal operation of the solar power plant. Only in case of a fault or failure, the high-resistance resistor is connected to the offset path within short term with regard to opening the DC circuit breaker and the AC circuit breaker. In this way, the high-resistance resistor limits the fault current flowing through the offset path to a safe level as soon as the circuit breakers in the parts of the offset path connected in parallel to the high-resistance resistor are opened so that the DC component of the fault current may no longer flow through the DC branch of the offset path. Such a high-resistance resistor may also be connected in parallel to the DC circuit breaker in the DC branch so that it reduces the fault current flowing through the DC voltage source to a safe level upon opening the DC circuit breaker. Such a resistor may also only be connected to the DC branch in case of a fault.

If a voltage sensor monitors the voltage dropping over the offset path in the circuitry arrangement of the present invention, the voltage sensor does not only detect any failures of the DC voltage source or of the offset voltage provided by the DC voltage source but also the disconnection of the DC branch from the offset path. This is due to the fact that disconnecting the AC branch means switching off the offset voltage; and without the offset voltage the electric potential of the electric line to which the offset part had been connected will deviate from the offset voltage. As the voltage dropping over the offset path will also break down in case of an earth fault of a center point conductor or of a phase conductor, it is also possible to trigger the circuit breakers in the offset path by the voltage sensor.

Thus, the voltage sensor may be configured to output an error signal in case of a stepwise variation of the voltage and/or in case of a significant or essential deviation of the voltage from the desired offset voltage value, the error signal indicating the reason for its emission and thus the likely cause of the failure occurring. A significant or essential deviation of the measured voltage from the desired offset voltage value means that the voltage detected by the voltage sensor is outside a predefined tolerance band surrounding the desired offset voltage value.

In the circuitry arrangement according to the present invention, a transformer having a center point at its primary side may be provided for the galvanic isolation. Then, the offset path may be connected to this center point. The center point may also be connected to the at least one inverter. If such a center point connector does not carry a current—like for example due to a certain switching topology of the inverter—, it may not be used directly but via its connections to the phase conductors in the transformer for providing the desired offset of the potential center point of a photovoltaic generator connected to the inverter.

If, on the other hand, a transformer having a delta configuration at its primary side is provided for the galvanic isolation, the offset path is to be connected to one of the electric lines used as a phase conductor from the inverter to the transformer. If, however, the offset path is connected to a phase conductor or any other electric line carrying an AC current, an AC voltage source has to be provided in series with the DC voltage source in the offset path to achieve the desired constant offset of the potential center point of photovoltaic generators connected to the inverter. Particularly, the AC voltage source should provide the same AC voltage which is present at the electric line carrying the DC current as a pure AC voltage component of the output voltage of the inverter. The AC voltage source is to be provided in a part of the offset path which is not branched into the DC branch and the AC branch as it would otherwise be shorted via the AC branch.

The offset path may alternatively be connected to an electric line used as a direct current conductor from the at least one generator terminal to the at least one inverter. With transformerless inverters, an offset of the generator potential via an offset path connected to one direct current conductor also results in an offset of the potential center point of the AC power grid connected to the output of the respective inverter. This offset of the center point in turn has an effect on all inverters connected in parallel to this AC power grid. In the case of the offset path being connected to an electric line used as a direct current conductor from one of several generators terminals to one of several inverters, however, the offset voltage is out of function for all generators connected if either the DC voltage source or the respective one inverter fails. Thus, shifting the generator potential by means of an offset path connected to one direct current conductor only makes sense with one or a low number of inverters.

The galvanic isolation in the new circuitry arrangement may alternatively be realized in a capacitive way. If, however, a transformer transforming to medium voltage is anyway comprised by the respective solar power plant, additional capacitors for realizing a capacitive galvanic isolation are not needed.

Now referring in greater detail to the drawings, the circuitry arrangement 1 for a solar power plant 2 depicted in FIG. 1, according to the present embodiment example, includes three transformerless inverters 3 each comprising a generator terminal 4 to which one photovoltaic generator 5 including several modules 6 is connected. For this connection, one DC current conductor 23 is provided for the positive pole and one DC current conductor 24 for the negative pole of the respective photovoltaic generator 5. The number of three inverters is just an example. The number of inverters 3 may even be much higher. There may, however, only be a single inverter 3 with a single generator terminal 4.

In the present embodiment example, the inverters 3 are three-phase inverters with three phase conductors L1, L2, L3 and a center point conductor M at their output, and the three-phase inverters are connected in parallel. A parallel connection of a plurality of single-phase inverters is also possible. In this case, same numbers of single-phase inverters are connected to the phase conductors L1, L2, L3 so that their entire power is distributed over the three phases as uniformly as possible. In a central transformer house 7, the three phase conductors L1, L2, L3 and the center point conductor M are connected to a primary side 8 of a transformer 9 comprising a center point configuration, the center point conductor being connected to the center point of the center point configuration. The transformer 9 transforms a low AC voltage at its primary side 8 upwardly into a medium voltage at its secondary side 10 and also provides a galvanic isolation towards a grid terminal 11. An AC power grid 12 into which the inverter 3 feeds electric power from the photovoltaic generators 5 via the transformer 9 is connected to the grid terminal 11.

In order to maximize the lifetime of the modules 6 of the photovoltaic generators 5, it will often be necessary to completely keep them at a defined electric potential with regard to earth potential PE. Thus, it is necessary to shift the potential center point of the photovoltaic generators 5 with regard to earth potential PE. When using transformerless inverters 3, such a potential shift may also be made at the output side of the inverters 3. For this purpose, a direct voltage source 13 is provided in an offset path 14 extending from the center point conductor M towards earth potential in the transformer house 7. The DC voltage source 13 provides an offset voltage between earth potential PE and the center point conductor M which shifts the potential center point of the photovoltaic generators 5 connected to the transformerless inverters 3 with regard to earth potential. If this shift or offset is higher than half of the output voltage of the photovoltaic generators 5, all modules 6 are at a positive electric potential with regard to earth potential. With a negative offset voltage, all modules may correspondingly be adjusted to a negative electric potential with regard to earth potential.

The offset path 14 is branched into a DC branch 15 and an AC branch 16 connected in parallel. In the DC branch 15, besides the DC voltage source 13 and a current sensor 17 connected in series with the DC voltage source 13, a current limiting resistor $R_S$ and a DC circuit breaker 18 comprising means for avoiding or extinguishing a switching arc (not separately depicted here) are provided. A capacitor $C_{ab}$ is provided in the AC branch 16. With a capacitance of typically 100 μF to 1000 μF, the capacitor $C_{ab}$ is adjusted in such a way that it just provides a low AC resistance for all alternating currents potentially flowing through the offset path 14 so that these alternating currents essentially flow through the AC branch 16 and not through the DC branch 15, i. e. not through the DC voltage source 13.

In this way it is cared for that the DC voltage source 13 is unloaded from such alternating currents on the one hand. On the other hand, splitting the offset path 14 into a DC branch 15 and an AC branch 16 ensures a secure detection of earth faults with a clearly reduced risk of false alarms. As the current sensor 17 is arranged in the DC branch 15, it essentially only detects the DC component of a current flowing through the entire offset path 14. Thus, the current sensor 17 is decoupled from variations of the leakage currents to a far reaching extent. On the other hand, the isolation current is only prone to weather dependent variations to a much smaller extent, and, thus, a variation of the isolation current is a comparatively strong indication of an isolation fault in the solar power plant 2. False alarms of the earth fault surveillance by the current sensor 17 are thus effectively suppressed. Further, the current flowing through the DC branch 15 may be switched off with the DC circuit breaker 18 which is provided with means for avoiding or extinguishing switching arcs, but which may have a comparatively small dimension as it only has to switch off comparatively low direct currents. Due to the capacitive separation by means of the capacitor $C_{ab}$, only an alternating current with defined zero crossings may flow through the offset path 14 after disconnecting the DC branch 15. Such an alternating current with defined zero crossings may be switched off by means of a common AC circuit breaker 19 without problems. Correspondingly, the current sensor 17 upon occurrence of a current through the DC branch 15 exceeding a threshold value which is an indication of an isolation or earth fault, at first triggers the DC circuit breaker 18 and only then the AC circuit breaker 19.

The DC voltage source 13 is connected to the center point conductor M and a phase conductor L1 for energy supply via switches S1 and S2. By closing and opening these two switches S1 and S2, the DC voltage source 13 may be activated and deactivated. The offset voltage of the DC voltage source 13 is variable. Particularly, it is at least variable between typically 400 and 500 V as the output voltage of the photovoltaic generators 5 is also not constant and depends on the respective insolation and the operation mode of the inverters 3. The offset voltage is suitably at least half the output voltage of the photovoltaic generators 5. Via a switch S3 in the offset path 14, the offset voltage is connected to the center point conductor M. The switch S3, however, is not suited for disconnecting the offset path 14 if a higher current, like for example a fault current, flows through the offset path 14.

A voltage sensor 20 monitors the voltage between the center point conductor M and earth potential PE which is applied by the DC voltage source 13, i.e. the offset voltage. If the offset voltage does not reach a desired value, the voltage sensor 20 may output an error signal via a communication interface 21, which may be an e-mail or a GSM, for example. Such an error signal may be issued by the voltage sensor 20 also then, when it registers a sudden variation of the voltage between the center point conductor M and earth potential which occurs if the offset path 14 is disconnected and the potential reference via the offset path 14 is lost. The voltage sensor 20 is also suitable to survey or monitor the correct function of the DC voltage source 13.

The voltage sensor 20 is, however, not absolutely necessary for realizing an earth fault surveillance or monitoring. For this purpose, it is also possible to connect the current sensor 17—in addition to its connections to the DC circuit breaker 18 and the AC circuit breaker 19—directly to the communication interface 21. In this case, a proper working voltage source 13 is assumed, and directly upon exceeding a current threshold both the DC circuit breaker 18 and the AC circuit breaker 19 are opened and an error signal like for example an e-mail or a GSM is issued. As an alternative to the depicted control of the circuit breakers 18 and 19 by the current sensor 17, it is also possible to control an opening of the DC circuit breaker 18 and the AC circuit breaker 19 in case of a fault via the voltage sensor 20. This is possible because, with an earth fault of the center point conductor M or one of the phase conductors L1, L2, L3, even with a closed DC circuit breaker 18 and a closed AC circuit breaker 19, the voltage dropping over the offset path 14 breaks down. This sudden change of the voltage is detected by the voltage sensor 20.

A high-resistance resistor 22 is optionally connected in parallel to the DC branch 15 and the AC branch 16 inclusive of the AC circuit breaker 19 in the offset path 14, which is indicated with a dashed line for the conductor in which the resistor 22 is arranged. In one embodiment, the high-resistance resistor 22 is only switched in the offset path via a switch (not depicted) in case of a fault to avoid losses in normal operation. For this purpose, the switch may also be controlled by the current sensor 17. Upon the current through the DC branch 15 exceeding a current threshold value, the current sensor 17 in a time-wise vicinity to opening the DC circuit breaker 18 and the AC circuit breaker 19 completely connects the high-resistance resistor 22 to the offset path 14. Via the resistor 22, any fault current may go on flowing, but only at a reduced amperage corresponding to the high resistance of the resistor 22. In this case, the offset path 14 is not completely disconnected, but the fault current is reduced to a safe value by connecting the high-resistance resistor 22. A limitation only of the DC component flowing through the DC voltage source 13 of an occurring fault current may also be realized in that a high-resistance resistor is connected in parallel to the DC circuit breaker 18 and optionally also to the current limitation resistor $R_S$ which upon opening of the DC circuit breaker 18 in some way increases the value of the current limiting resistor $R_S$.

In the following FIGS. 2 to 4 the same circuitry arrangement 1 as in FIG. 1 is depicted besides that for reasons of clarity the voltage sensor 20 and its communication interface 21 and the optional resistor 22 are omitted.

Figure 2:
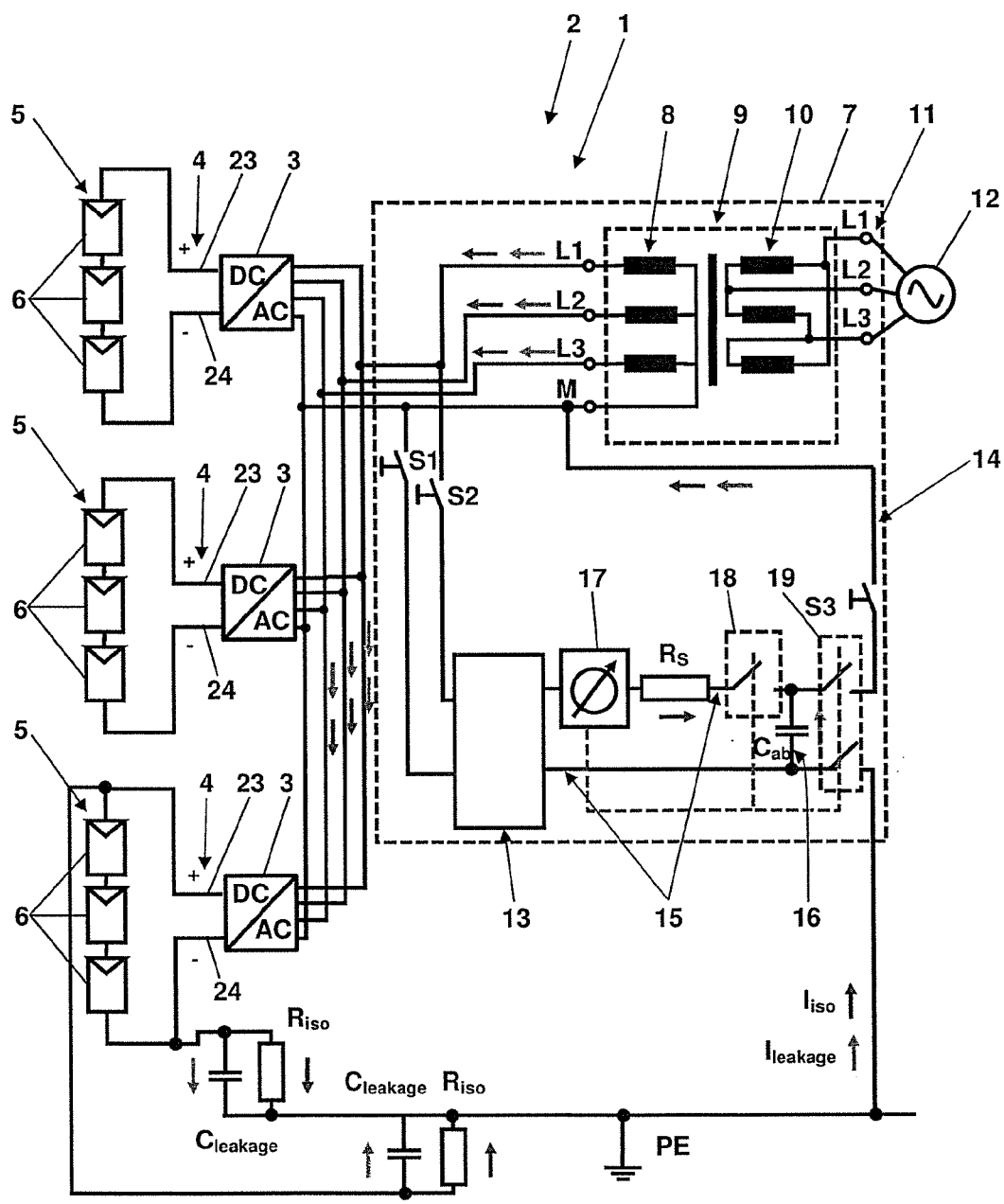
FIG. 2 illustrates the flow of leakage and isolation currents in the circuitry arrangement according to FIG. 1.

FIG. 2 illustrates the currents flowing through the offset path 14 in normal operation of the circuitry arrangement 1 and their cause. A current $I_{iso}$ is the current flowing through the isolation resistances $R_{iso}$ due to the offset voltage of the DC voltage source 13. This current $I_{iso}$ is a direct current which correspondingly flows through the DC branch 15 of the offset path 14. Additionally, there is a current $I_{leakage}$ which flows via the leakage capacitances $C_{leakage}$ of the photovoltaic generators 3 towards earth potential. The current $I_{leakage}$ is an alternating current which correspondingly flows through the AC branch 16 of the offset path 14.

The direct current $I_{iso}$ increases with increasing number of the connected inverters 3 due to an additional power connection of further isolation resistances $R_{iso}$. Even with plant sizes of up to 50 inverters connected in parallel to the grid, the entire direct current $I_{iso}$ is typically below 50 mA. Thus, only a low voltage in the range of up to 25 V drops over the resistor $R_S$ of typically 500 Ohm. This corresponds to a power of about 1.3 W which is dissipated in the resistor $R_S$ into heat. The direct current $I_{iso}$ is mainly determined by the offset voltage provided by the DC voltage source 13 between the center point conductor M and earth potential PE. In case of an earth fault of the PV generator or one of the phase conductors L1, L2 and L3 or of the center point conductor M, the direct current $I_{iso}$ suddenly increases. In contrast to the direct current $I_{iso}$, the alternating current $I_{leakage}$ may—depending on weather conditions and the present mode of operation of the inverters 3—reach several ampere even in undisturbed normal operation of the circuitry arrangement 1, and it may strongly vary with the weather condition and the operation mode of the inverters. For example, different alternating currents $I_{leakage}$ occur in operation of input side boost converters of the inverters in operation of the inverters with so-called overmodulation and in operation without boost converters and without overmodulation. Similarly, strongly varying alternating currents $I_{leakage}$ occur with dry modules 6 and with wet modules 6 due to rain and thus strongly varying values of $C_{leakage}$. These alternating currents via the AC branch 16 of the offset path 14, however, do not stress the DC voltage source 13, and they are also not measured by the current sensor 17.

Figure 3:
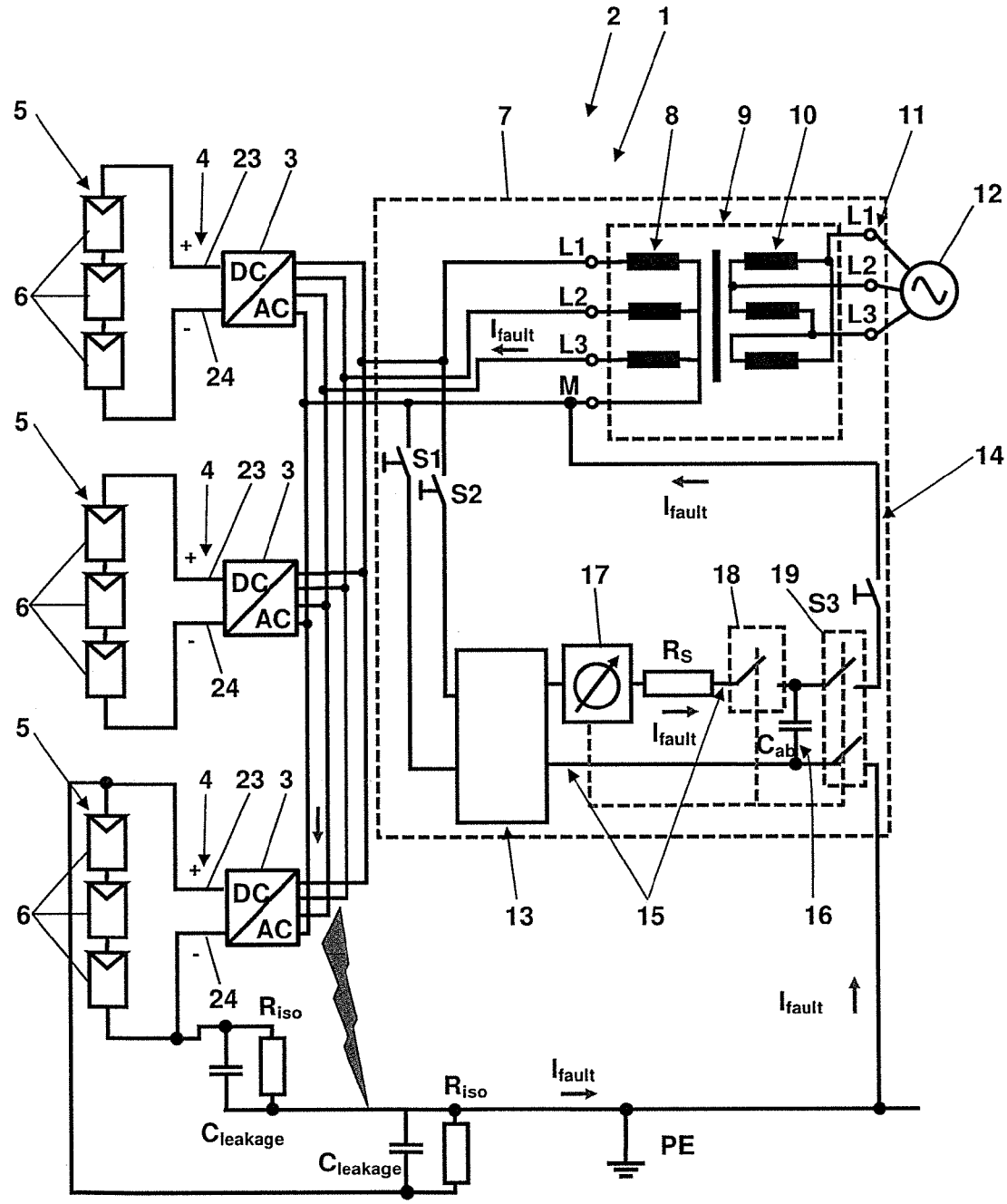
FIG. 3 illustrates the flow of a fault current in the circuitry arrangement according to FIG. 1 in the case of an undesired connection of one phase to earth.

FIG. 3 shows the occurrence of a fault current $I_{fault}$, here due to an earth fault of the phase conductor L3 in the area of the lower inverter 3. This fault current $I_{fault}$ flows from earth potential PE via the offset path 14 back to the phase conductor L3. In the offset path 14, the fault current $I_{fault}$ is divided into its DC component flowing via the DC branch 15 and into its AC component flowing through the AC branch 16. The DC component of the fault current $I_{fault}$ is that component which is driven by the offset voltage of the DC voltage source 13, and it is measured by the current sensor 17. By means of opening the DC circuit breaker 18, the DC component of the fault current $I_{fault}$ is switched off. Up to opening the DC circuit breaker 18, the resistor $R_S$ limits the DC component of the fault current $I_{fault}$ which flows through the DC voltage source 13. The successive opening of the AC circuit breaker 19 also switches off the AC component of the fault current $I_{fault}$.

After completely disconnecting the offset path 14, the remaining grid at the primary side of the transformer corresponds to a so-called IT (isolée terre) grid with one earth fault, and the solar power plant 2 may, at least temporarily, be further operated with this reference to earth provided by the earth fault. Thus, necessary preparations for repairing the fault may occur without interrupting the feeding of electric energy by the inverter 3 into the grid 12. It is to be understood that up to disconnecting the offset path 14 the currents $I_{iso}$ and $I_{leakage}$ according to FIG. 2 in addition to the fault current $I_{fault}$ flow through the offset path 14. After disconnecting the offset path 14, these currents $I_{iso}$ and $I_{leakage}$ are compensated by voltage variations at the primary side 8 of the transformer 9.

Figure 4:
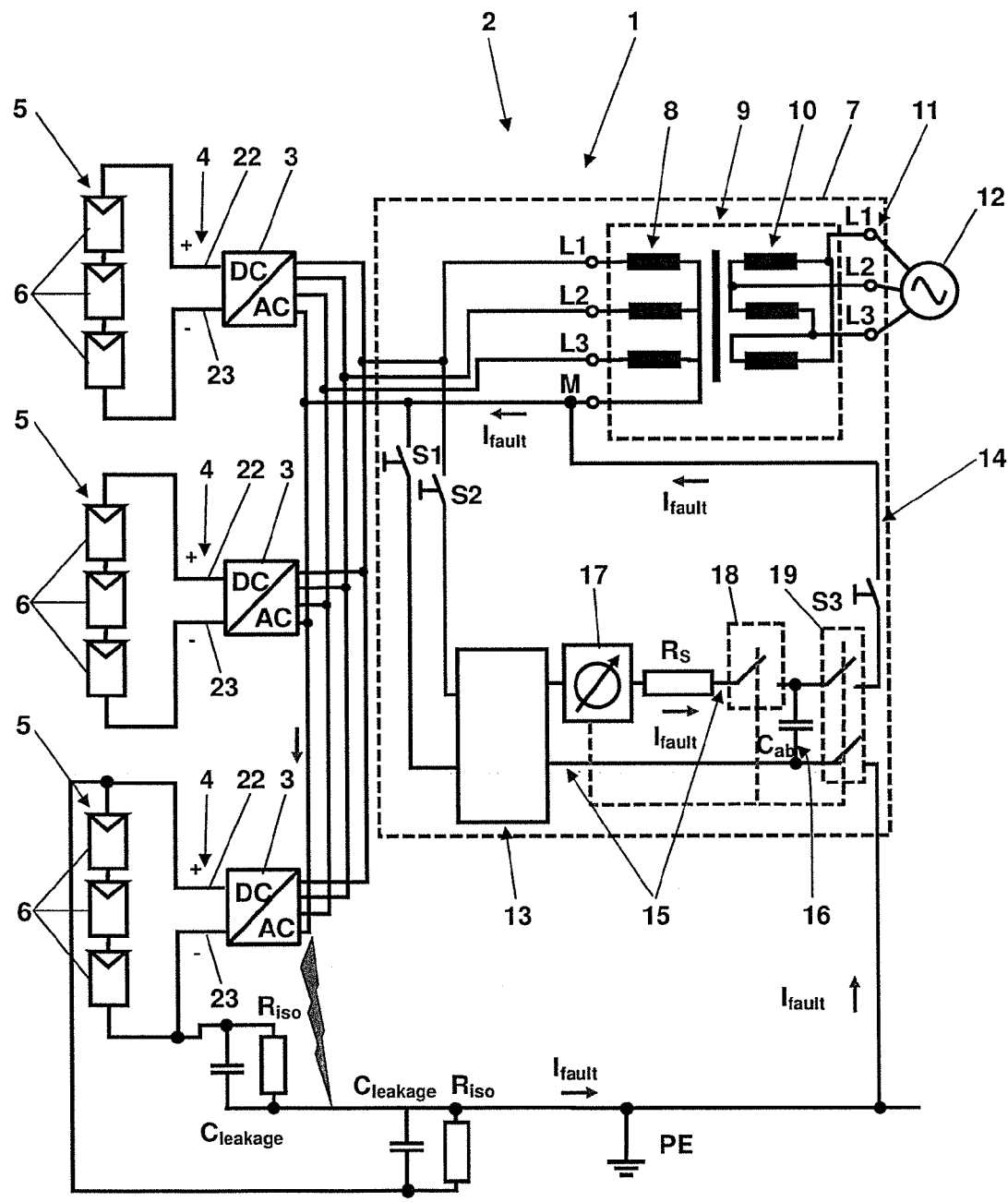
FIG. 4 illustrates the flow of a fault current in the circuitry arrangement of FIG. 1 in the case of an undesired connection of a center point conductor to earth.

FIG. 4 illustrates the case of a fault current $I_{fault}$ due to an earth connection of the center point conductor M. The resulting fault current $I_{fault}$ is a pure direct current which flows through the DC branch 15 of the offset path 14 until it is switched off by opening the DC circuit breaker 18. In this case, the AC circuit breaker 19 could, in principle, remain closed. Otherwise, the same applies as said with reference to FIG. 3. By quickly switching off the fault current $I_{fault}$ by disconnecting the offset path 14, the danger due to the fault current $I_{fault}$ is stopped, and the solar power plant 2 may, at least temporarily, be operated further. This means that necessary preparations for repairing the fault may be carried out without interrupting the feeding of electric power. At least a regular shut down of the solar power plant 2 is possible without danger.

Figure 5:
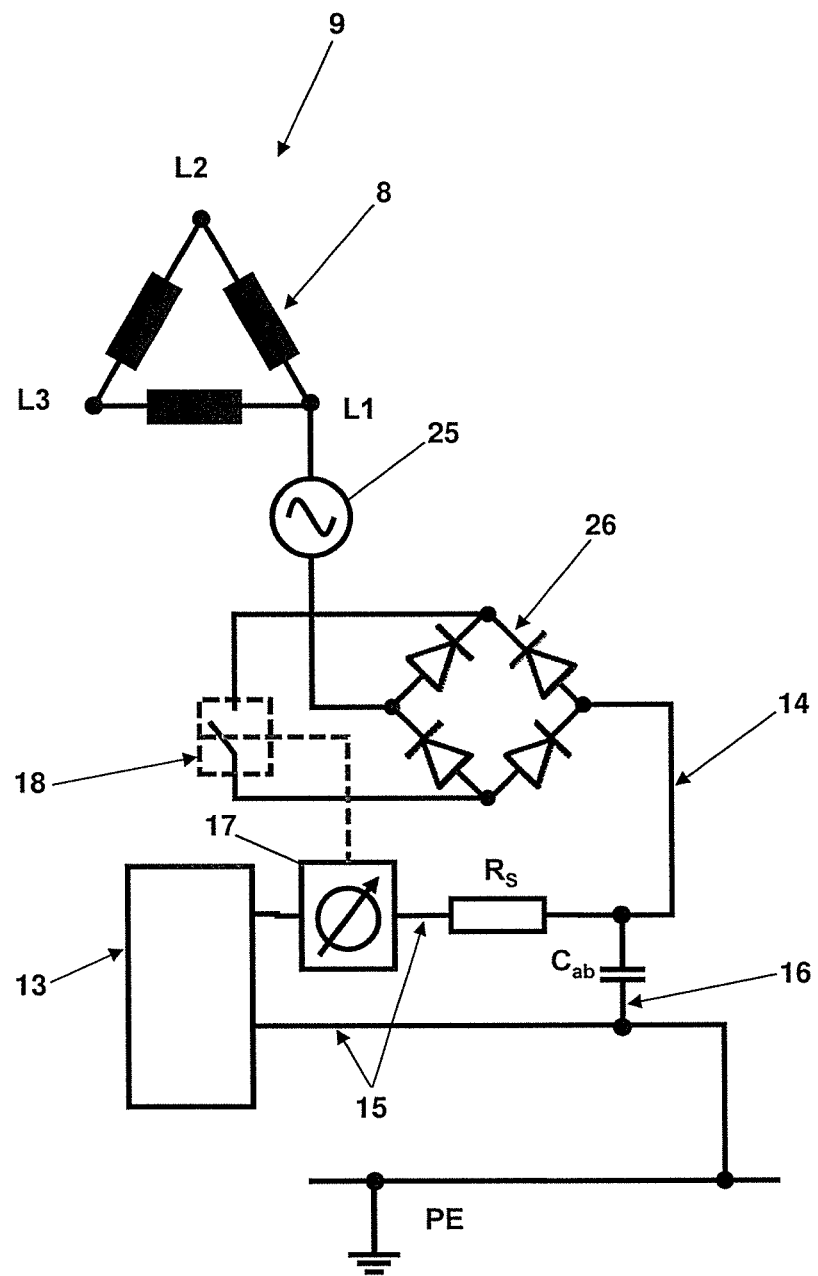
FIG. 5 shows a second embodiment of the circuitry arrangement of the present invention in the case of an output side transformer having a primary winding in a delta configuration without center point.

In FIG. 5 only those details of another embodiment of the circuitry arrangement 1 which differ from the embodiments depicted in FIGS. 1 to 4 are depicted. Thus, the primary side 8 of the transformer 9 does not comprise a center point M here. In this case, the offset path 14 extends from one of the phase conductors, here L1, towards earth potential PE. The DC voltage source 13 is connected in series with an AC voltage source 25 in the offset path 14 to be able to shift the potential center point of photovoltaic generators connected via transformerless inverters by the offset voltage provided by the DC voltage source 13 despite the alternating voltage present at the phase conductor L1. The AC voltage source 25 generates an alternating voltage corresponding as exactly as possible to the pure AC voltage component of the voltage present at the phase conductor L1. This AC voltage is added to the offset voltage provided by the DC voltage source 13. Particularly, the AC voltage of the AC voltage source 25 corresponds to the pure AC voltage component of the phase conductor L1 with regard to both amplitude and frequency. The AC voltage source 25 is provided outside of the part of the offset path 14 branched into the DC branch 15 and the AC branch 16 to avoid shorting by the AC branch 16. Whereas the AC voltage source 25 is provided between the DC voltage source 13 and the phase conductor L1 here, it could alternatively be provided between the DC voltage source 13 and earth potential PE.

FIG. 5 further illustrates the option of switching off a fault current flowing through the offset path 14 with a single circuit breaker. For this purpose, the DC circuit breaker 18 is provided outside of the part of the offset path 14 branched into the DC branch 15 and the AC branch 16, and it is combined with a full wave rectifier 26 which ensures a fixed direction of the current flowing through the DC circuit breaker 18. It is to be understood that the DC circuit breaker 18 is also provided with suitable means for avoiding or extinguishing switching arcs which are not depicted here but well known to those skilled in the art.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A circuitry arrangement for a solar power plant comprising:
    at least one generator terminal configured to connect to a photovoltaic generator;
    a grid terminal configured to connect to an AC power grid;
    at least one transformerless inverter configured to feed electric power from a photovoltaic power generator when connected to the at least one generator terminal into an AC power grid when connected to the grid terminal;
    first electric lines extending between the at least one generator terminal and the at least one inverter, and second electric lines extending between the at least one inverter and the grid terminal;
    a galvanic isolation provided in all second electric lines carrying a current between the at least one inverter and the grid terminal; and
    an offset path leading from one of the first and second electric lines on a side of the galvanic isolation opposing the grid terminal to a reference potential, the offset path comprising:
        a direct current branch and an alternating current branch connected in parallel,
        at least one capacitor arranged in the alternating current branch,
        a DC voltage source arranged in the direct current branch, the DC voltage source configured to provide an offset voltage to adjust an electric potential of the photovoltaic power generator when connected to the at least one generator terminal with regard to earth potential,
        a current sensor connected in series with the direct voltage source in the direct current branch, and
        a direct current contactor arranged in the offset path and configured to switch off at least a direct current component of a fault current flowing through the offset path.

2. The circuitry arrangement of claim 1, wherein the current sensor is configured to trigger the direct current contactor.

3. The circuitry arrangement of claim 1, wherein the reference potential is earth potential.

4. The circuitry arrangement of claim 1, further comprising a resistor connected in series with the direct voltage source in the direct current branch.

5. The circuitry arrangement of claim 1, wherein the direct current contactor is connected in series with the direct voltage source in the direct current branch.

6. The circuitry arrangement of claim 5, further comprising an alternating current contactor arranged in the offset path outside the direct current branch.

7. The circuitry arrangement of claim 6, wherein the alternating current contactor only opens when the direct current contactor is already open.

8. The circuitry arrangement of claim 1, wherein the direct current contactor is connected to a full wave rectifier.

9. The circuitry arrangement of claim 1, wherein the direct current contactor is configured to avoid or extinguish a switching arc.

10. The circuitry arrangement of claim 1, further comprising a voltage sensor configured to monitor a voltage drop over the offset path.

11. The circuitry arrangement of claim 10, wherein the voltage sensor is configured to output an error signal in case of a stepwise variation of the voltage drop over the offset path or a predetermined deviation of the voltage drop over the offset path from a desired offset voltage value.

12. The circuitry arrangement of claim 1, wherein the galvanic isolation is provided by a transformer with a center point at its primary side, wherein the offset path is connected to the center point.

13. The circuitry arrangement of claim 1, wherein the galvanic isolation is provided by a transformer with a delta configuration at its primary side, wherein the offset path is connected to a phase line of the second electric lines.

14. The circuitry arrangement of claim 1, wherein the offset path is connected to one of the second electric lines carrying an alternating current, wherein an alternating voltage source is connected in series with the direct voltage source in the offset path.

15. The circuitry arrangement of claim 14, wherein the alternating voltage source is configured to provide a same alternating voltage as present at the second electric line carrying the alternating voltage as an output voltage of the inverter.

16. The circuitry arrangement of claim 1, wherein the offset path is connected to one of the first electric lines.

* * * * *